(12) United States Patent
Zou

(10) Patent No.: US 10,143,061 B2
(45) Date of Patent: Nov. 27, 2018

(54) CONSTANT CURRENT POWER SUPPLY WITH A PLURALITY OF CURRENT OUTPUTS FOR LED LAMPS

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventor: Xuejun Zou, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/819,912

(22) Filed: Nov. 21, 2017

(65) Prior Publication Data

US 2018/0146529 A1    May 24, 2018

(30) Foreign Application Priority Data

Nov. 23, 2016 (CN) .......................... 2016 1 1047767

(51) Int. Cl.
| | |
|---|---|
| *H05B 33/08* | (2006.01) |
| *H02M 3/335* | (2006.01) |
| *H02M 1/32* | (2007.01) |
| *H02M 1/08* | (2006.01) |
| *H02M 1/00* | (2006.01) |

(52) U.S. Cl.
CPC .......... *H05B 33/0887* (2013.01); *H02M 1/32* (2013.01); *H02M 3/33523* (2013.01); *H02M 3/33576* (2013.01); *H05B 33/089* (2013.01); *H05B 33/0815* (2013.01); *H02M 1/08* (2013.01); *H02M 2001/0009* (2013.01); *Y02B 20/341* (2013.01)

(58) Field of Classification Search
CPC .......................... H05B 33/08; H05B 33/0815; H05B 33/0851; H05B 33/0887; H05B 33/089; H02M 1/08; H02M 1/32; H02M 2001/0003; H02M 2001/0006; H02M 2001/0009; H02M 3/156; H02M 3/335; H02M 3/33576
See application file for complete search history.

(56) References Cited

U.S. PATENT DOCUMENTS

| | | | |
|---|---|---|---|
| 2007/0188112 A1* | 8/2007 | Kang | H05B 33/0815 315/291 |
| 2011/0057634 A1* | 3/2011 | Kunimatsu | H02M 3/156 323/282 |

(Continued)

*Primary Examiner* — Thai Pham
(74) *Attorney, Agent, or Firm* — Wang Law Firm, Inc.

(57) ABSTRACT

A constant current power supply with a plurality of current outputs for LED lamps includes a DC/DC control module, an overvoltage detection circuit, a current sampling resistor, at least one output current conversion circuit and at least one overvoltage protection resistor. The output current conversion circuit includes a switch, a MOS transistor with a grid electrode electrically connected to the switch, and a current conversion sampling resistor. The overvoltage protection resistor is connected in series between the two voltage sampling resistors and the grid electrode of the MOS transistor. The constant current power supply of the present invention can output various current values through the output current conversion circuit so as to be able to adapt to different LED loads. One power supply can be applied in a variety of applications.

8 Claims, 3 Drawing Sheets

(56) References Cited

U.S. PATENT DOCUMENTS

| | | | |
|---|---|---|---|
| 2011/0057674 A1* | 3/2011 | Weissacher | G01R 31/2891 |
| | | | 324/750.16 |
| 2011/0141776 A1* | 6/2011 | Lin | H02H 7/125 |
| | | | 363/53 |
| 2014/0077719 A1* | 3/2014 | Fukuda | H05B 33/08 |
| | | | 315/224 |
| 2016/0234894 A1* | 8/2016 | Wang | H05B 33/0815 |
| 2017/0188420 A1* | 6/2017 | Kido | H04B 10/116 |

\* cited by examiner

US 10,143,061 B2

CONSTANT CURRENT POWER SUPPLY WITH A PLURALITY OF CURRENT OUTPUTS FOR LED LAMPS

RELATED APPLICATION

This application claims priority to Chinese Patent Application No. CN 201611047767.5, filed on Nov. 23, 2016.

BACKGROUND

1. Technical Field

The present invention relates to an application current field of lamp lighting, with particular emphasis on a constant current power supply with a plurality of current outputs for LED lamps.

2. Description of the Related Art

In ordinary daily life, all kinds of lighting apparatus can be seen everywhere, such as fluorescent lamps, street lamps, table lamps, artistic lamps and so on. In the above-described lighting apparatus, the tungsten bulb is traditionally used as a light-emitting light source. In recent years, due to the ever-changing technology, light-emitting diode (LED) has been used as a light source. Moreover, in addition to lighting apparatus, for the general traffic signs, billboards, headlights etc., light-emitting diode (LED) has also been used as a light source. The light-emitting diode (LED) as a light source has the advantages of energy-saving and greater brightness. Therefore, it has been gradually common.

However, when a public power is used for power supply, the public power should usually be converted into direct current suitable for the LED lamps, and the direct current can be constant voltage or constant current. In the prior art, a DC/DC control module is generally used as power components to convert the public power into DC power suitable for LED lamps. The DC/DC control module is an integrated circuit, which is equipped with internal oscillator and chopper module. The internal shock part of the DC/DC control module is used to change the size of the output voltage through controlling its duty cycle so as to achieve the purpose of output power conversion. For example, it allows 10V to pass in one time period and forbids 10V to pass (equal to 0 v) for another time period. And in the output of DC/DC control module, a capacitor is used to filter, as long as the capacitor is large enough, the result is equivalent to taking calculus of the middle of the pulse waveform and it outputs a 5V DC waveform. The DC/DC control module has many functional inputs, such as overvoltage protection input, feedback input and so forth. However, in practical application, because of the different load, different constant current power supplies with different current values need to be used. If one power supply only has one current value, it will not only result in waste of resources, but also cause the great cost of production. Therefore, both the users and the manufacturer expect that a constant current power supply can have different output current values.

BRIEF DESCRIPTION OF THE DRAWINGS

The drawings described herein are intended to promote a further understanding of the present invention, as follows.

DETAILED DESCRIPTION OF THE INVENTION

The present application is illustrated by way of the following detailed description based on of the accompanying drawings. It should be noted that illustration to the embodiment in this application is not intended to limit the invention.

Figure 1:
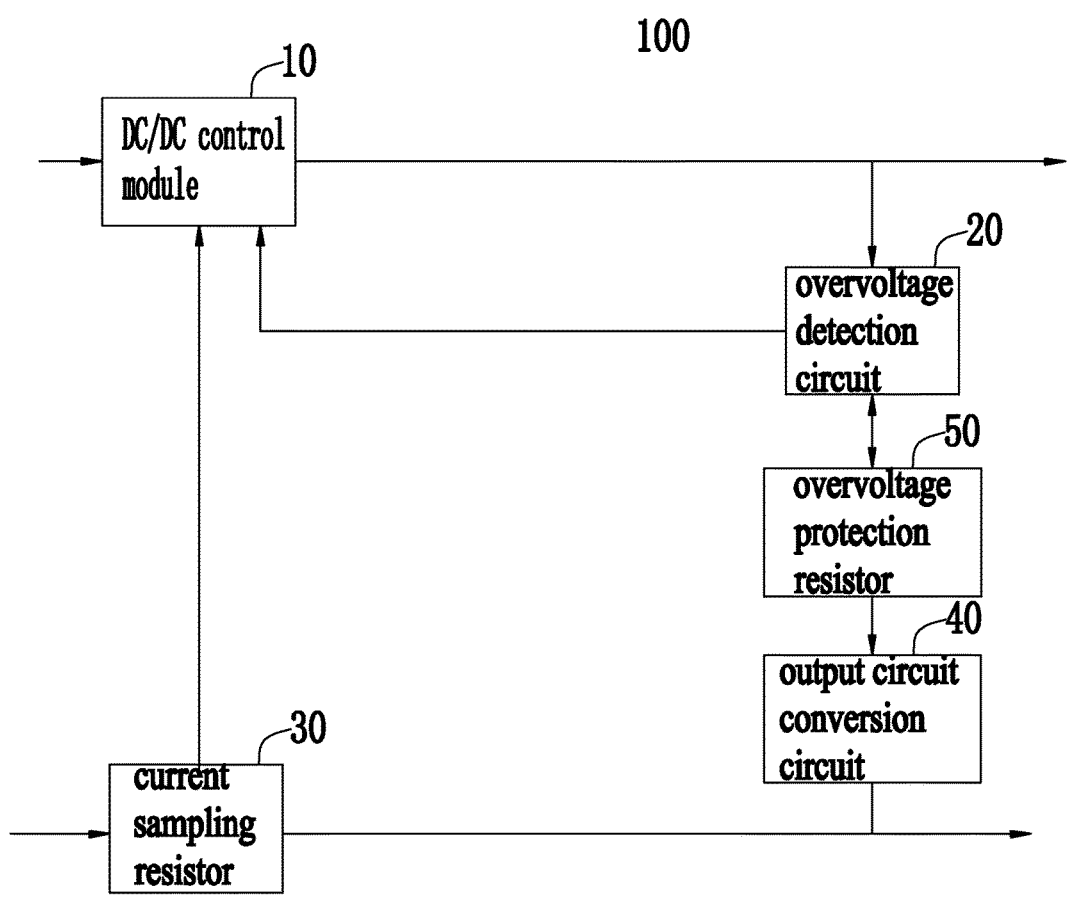
FIG. 1 is a block diagram of a constant current power supply with a variety of current outputs for LED lamps according to an embodiment.
Figure 2:
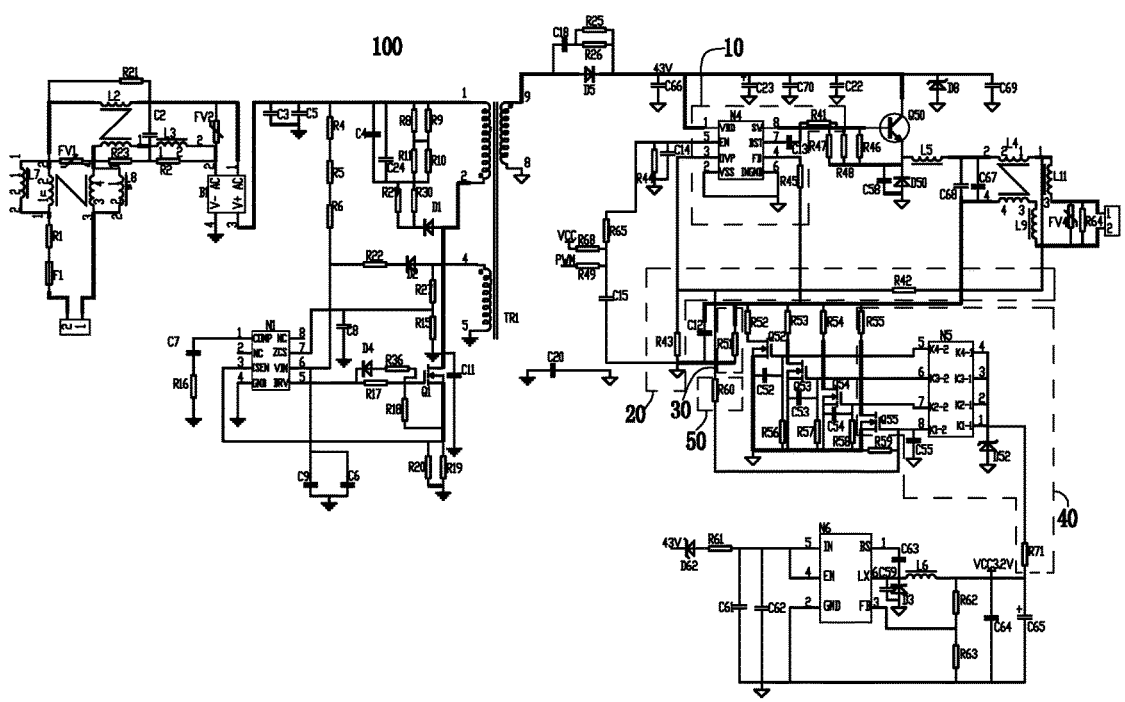
FIG. 2 is a circuit diagram of a constant current power supply with a variety of current outputs of LED lamps of FIG. 1.

Referring to FIG. 1 to FIG. 2, a constant current power supply 100 with a plurality of current outputs for LED lamps are provided in an embodiment of the present invention. The constant current power supply 100 with a plurality of current outputs for LED lamps includes a DC/DC control module 10 for controlling to output a constant current value, an overvoltage detection circuit 20 electrically connected to the DC/DC control module 10, a current sampling resistor 30 connected in series in the loop of the constant current supply 100, at least one output circuit conversion circuit 40 connected in parallel with the current sampling resistor 30, and at least one overvoltage protection resistor 50 electrically connected between the output current conversion circuit 40 and the overvoltage detection circuit 20. It can be understood that the constant current power supply 100 also includes other functional modules, such as a transformer electrically connected to the front end of the DC/DC control module 10 to provide a suitable voltage thereto, a rectifier circuit, a filter circuit, an under-voltage protection circuit and so on, which are well known to those skilled in the art and will not be described here. Moreover, the circuit shown in FIG. 1 no longer shows the above circuit modules which have been shown in FIG. 2.

Figure 3:
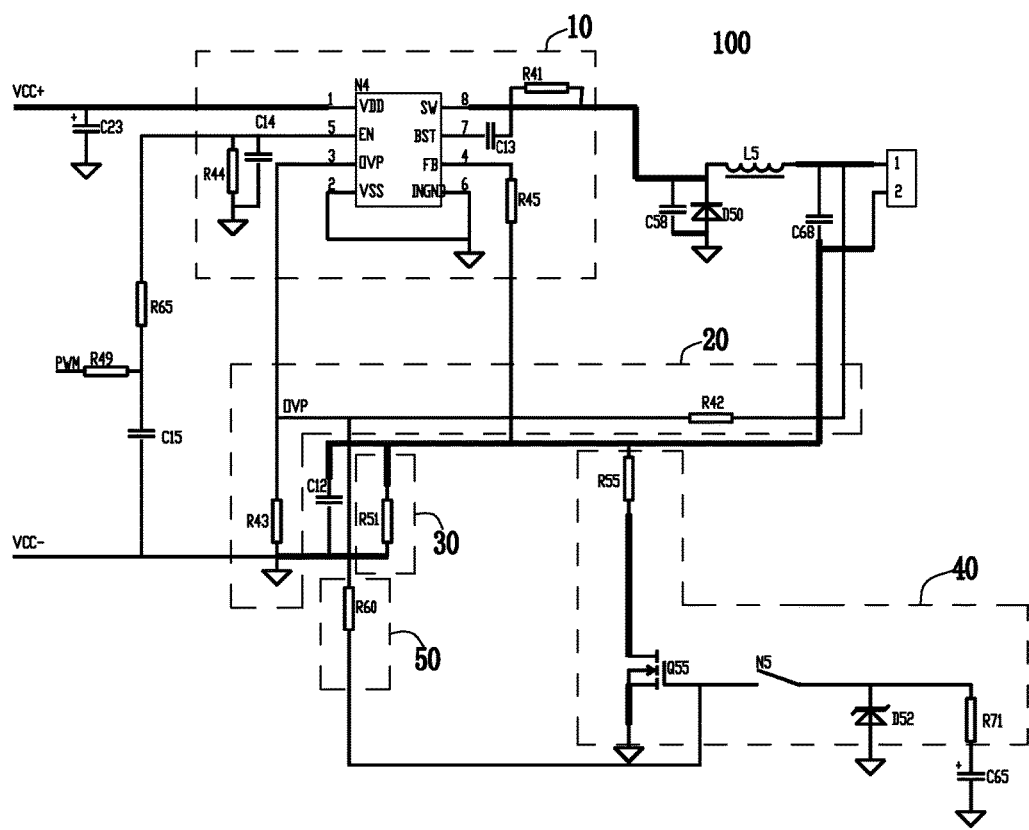
FIG. 3 is a simplified circuit diagram of a constant current power supply with a variety of current outputs of LED lamps of FIG. 2.

Referring to FIG. 3 together, in order to understand the circuit diagram conveniently, a circuit shown in FIG. 3 is a simplified circuit diagram of FIG. 2, while FIG. 2 is the practice circuit diagram. The DC/DC control module 10 includes a DC/DC control chip N4 and some peripheral circuits operating in conjunction with the DC/DC control chip N4. As the DC/DC control chip N4 is well known to those skilled in the art, its specific circuit configuration and operating principle are no longer illustrated in details. The DC/DC control chip N4 has a variety of inputs, such as voltage input (VDD pin), power switch output (SW pin), overvoltage protection input (OVP pin), and constant current feedback input (FB pin) and so on. The peripheral circuit is used to provide a suitable working environment for the DC/DC control chip N4. As shown in FIG. 2, the capacitor and the resistor element are electrically connected to the EN pin so that the DC/DC control chip N4 can work normally, and both VSS pin and INGND pin are grounded.

The overvoltage detection circuit 20 is used to provide a voltage signal in the loop of the constant current supply 100 for the DC/DC control module 10 so as to trigger the overvoltage protection switch by the DC/DC control chip N4 at appropriate time to protect the entire circuit. The overvoltage detection circuit 20 is electrically connected to the high level output of the DC/DC control module 10 and includes two voltage sampling resistors R42 and R43 collected in series. One end of the two voltage sampling resistors R42, R43 is electrically connected to the high level output terminal of the constant current power supply 100 and the other thereof is grounded. According to the general voltage sampling principle, the OVP pin of the DC/DC control chip N4 is electrically connected between the two sampling resistors R42, R43. Since one end of the sampling resistor R43 is grounded and the voltage of the end is zero, the voltage applied to the sampling resistor R43 is normally the sampling voltage. When the voltage in the loop rises, the sampling voltage also rises. When the sampling voltage exceeds the overvoltage threshold set by the DC/DC control chip N4, the DC/DC control chip N4 turns off an output of the power switch, that is to say, the entire circuit loop is turn off by SW pin.

The current sampling resistor 30, i.e. the resistor R51, is connected in series in the loop of the constant current power supply 100 to obtain the current value of the entire circuit, and to return the current value back to the DC/DC control chip N4, that is, to the constant current feedback input of the DC/DC control chip N4, i.e. FB pin. According to this feedback value, the DC/DC control chip N4 can control or adjust its current output value to keep the same value so as to achieve the purpose of outputting constant current. Thus, the constant current feedback input is electrically connected to one end of the current sampling resistor 30. In order to ensure that the input voltage is not too large to damage the DC/DC control chip N4, a protection resistor R45 is also connected in series between the constant current feedback input, i.e. FB pin and the current sampling resistor 30. To sample simply, the other of the resistor R51 is grounded. Therefore, a current flowing through R51 may be calculated by formula $I_1 = V_{FB}/R51$.

The output current conversion circuit 40 is connected in parallel with the current sampling resistor 30 and includes a switch N5, a MOS transistor Q55 with a grid electrode electrically connected to the switch N5, and a current conversion sampling resistor R55 electrically connected between a drain of the MOS transistor Q55 and an output of the constant current power supply 100. Moreover, it can be understood that in order to allow the output current conversion circuit 40 to operate normally, other functional components should be included, such as a current limiting resistor R71, a regulator tube D52 which can keep the MOS transistor open. For those skilled in the art, when the above-mentioned output current conversion circuit 40, such as the switch N5, the MOS transistor Q55, the resistor R55, and the electrical connection method thereof are selected, it is necessary to add the above functional components in order to allow it to operate normally. It need further to describe that, as shown in FIG. 2, the N5 is a DIP switch. When K1-1 and K1-2 are closed, the K1 is turned on, and when K2-1 and K2-2 are closed, K2 is turned on etc. Of course, it is contemplated that one or more of the K1 to K4 may simultaneously turn on or off to obtain different outputs. A source of the MOS transistor Q55 is grounded, and the grid electrode of the MOS transistor Q55 is at a low level when the switch N5 is turned off. Therefore, the MOS transistor Q55 is turned off and the current in the entire loop of the constant current power supply 100 is still $I_1$. When the switch N5 is closed, the grid electrode of the MOS transistor Q55 is at a high level so as that the MOS transistor Q55 is turned on which means that a short circuit is occurred in the loop. The current in the entire loop of the constant current power supply 100 flows through the resistor R55 and the current flowing through R51 can be calculated by formula $I_2 = V_{FB}/R51$. Therefore, the current value in the entire loop of the constant current power supply 100 is the sum of $I_1$ and $I_2$. Therefore, the current value in the entire circuit of the constant current power supply 100 is larger so that the current conversion is achieved. It can be understood that the constant current power supply 100 may include more than one output current conversion circuits 40, such as two. Many output current conversion circuits 40 are connected in parallel so that the current value in the entire circuit of the constant current power source 100 is the sum of $I_1$ and the current flowing through each current conversion sampling resistor. When the output current conversion circuit 40 is switched by the switch N5, a plurality of different current output values can be obtained so that the constant current power supply 100 can complete the output of a plurality of current values.

However, as the feedback current of the feedback input of the DC/DC control chip N4 is only the current value $I_1$ which flows in the current sampling resistor R51 and when at least one way of the switch N5 is closed, the current output value of the constant current power supply 100 increases actually. Therefore, the output power will also increase and it is possible to lead to damage to other electronic components due to excessive heat, and even lead to fire hazard and other security incidents. Thus, the constant current power supply 100 of the present invention also includes an overvoltage protection resistor 50 electrically connected between the output current conversion circuit 40 and the overvoltage detection resistor 20, i.e., the resistor R60 of FIG. 2. In particular, the overvoltage protection resistor 50 is connected in series between the two voltage sampling resistors R42, R43 and the grid electrode of the MOS transistor Q55. The working principle will be described as follow. When switch N5 is fully turned off, the voltage at the grid electrode the MOS transistor Q55 is close to 0, that is, at low level and is turn off. Therefore no current flows through the overvoltage protection resistor 20. When at least one way of the switch N5 is turn on as described above, the current output value of the constant current power supply 100 increases, and the voltage at the grid electrode of the MOS transistor Q55 increases to a certain value. In the present circuit, the voltage is equal to the regulated voltage value of the regulator D52. Therefore, a small control current will flow through the overvoltage protection resistor 50 under the voltage, so that an additional voltage drop is added on the voltage sampling resistor R43 so as that the overvoltage protection input potential of the DC/DC control chip N4 increases. If the overvoltage protection resistor 50 is not electrically connected, the overvoltage protection will be stated when the overvoltage protection input of the DC/DC control chip N4 is 1.4 volts. However, when the overvoltage protection resistor 50 is electrically connected to the circuit, the additional voltage drop is added on the voltage sampling resistor R43. Therefore, the overvoltage protection will be started by the DC/DC control chip N4 before the voltage loaded on the only voltage sampling resistors R42, R43 has not rise into 1.4V. As a result, a maximum output current of the constant current power supply 100 increases and a maximum output voltage thereof decreases. Therefore, an output power is limited so as to avoid from damaging caused by excessive heat generation. Moreover, the voltage applied to the overvoltage protection resistor 50 is equal to the voltage of the grid electrode of the MOS transistor Q55. The voltage of the grid electrode of the MOS transistor Q55 is related to the circuit design of the entire output current conversion circuit 40 and may not be an arbitrary value. Otherwise, the constant current power supply 100 is difficult to start or does not work. It may be understood that when the constant current power supply 100 has a plurality of the output current conversion circuits 40, each of them is electrically connected to one overvoltage protection resistor 50.

As described above, as the output voltage is changed by controlling its duty cycle in via of the internal shock part of the DC/DC control chip N4, it has no power output at a certain time. However, for the smoothness of the output, an energy storage inductor L5 is also connected in series with the outputs of the DC/DC control module 10 of the constant current power supply 100. One end of the energy storage inductor L5 is electrically connected to the overvoltage detection circuit 20 and the other is electrically connected to the power switch output of the DC/DC control chip N4. Moreover, the constant current power supply 100 further includes a storage current diode D50 connected between one end of the energy storage inductor L5 and the ground, and the cathode of the storage current diode is grounded.

The constant current power supply 100 may have various output of current values in via of the output current conversion circuit so as to adapt to different LED loads. Therefore, the constant current power supply 100 can be applied in various applications. As a result, the production cost can be reduced and resources are saved and it is conducive to the users. Moreover, due to the use of the overvoltage protection resistor 50, it is possible to avoid damage or fire hazard caused by excessive heat generation due to the large output power of the DC/DC control module.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A constant current power supply with a plurality of current outputs for LED lamps, comprising:
   a DC/DC control module having overvoltage protection function and configured for controlling to output a constant current value;
   an overvoltage detection circuit electrically connected to the DC/DC control module, the overvoltage detection circuit comprising two voltage sampling resistors connected in series;
   a current sampling resistor connected in series in loop of the constant current power supply;
   at least one output current conversion circuit connected in parallel with the current sampling resistor, the output current conversion circuit comprising a switch, a MOS transistor with a grid electrode electrically connected to the switch, and a current conversion sampling resistor electrically connected between a drain of the MOS transistor and an output of the constant current power supply, a source of the MOS transistor being grounded; and
   at least one overvoltage protection resistor electrically connected between the output current conversion circuit and the overvoltage detection circuit, an overvoltage protection input of the DC/DC control module being electrically connected between two voltage sampling resistors, the overvoltage protection resistor connected in series between the two voltage sampling resistors and the grid electrode of the MOS transistor, each of output current conversion circuits being electrically connected to one overvoltage protection resistance.

2. The constant current power supply of claim 1, wherein the DC/DC control module comprises a constant current feedback input electrically connected to one end of the current sampling resistor.

3. The constant current power supply of claim 2, wherein further comprises a protective resistor connected in series between the constant current feedback input port and the current sampling resistor.

4. The constant current power supply of claim 1, wherein the constant current power supply comprises an energy storage inductor connected in series with the output of the DC/DC control module, one end of the energy storage inductor is electrically connected to the overvoltage detection circuit.

5. The constant current power supply of claim 4, wherein the constant current power supply further comprises a storage current diode connected between one end of the energy storage inductor and the ground, while the cathode of the storage current diode is grounded.

6. The constant current power supply of claim 1, wherein the constant current power supply comprises two output current conversion circuits connected in parallel.

7. The constant current power supply of claim 6, wherein each of the overvoltage protection resistor connected to the output current conversion circuit is electrically connected between the grid electrode of the MOS transistor of the output current conversion circuit and the overvoltage detection circuit.

8. The constant current power supply of claim 1, wherein the overvoltage detection circuit is electrically connected to a high level output of the DC/DC control module.

\* \* \* \* \*